C. ROTH.
AUTOMOBILE SIGNAL DEVICE.
APPLICATION FILED OCT. 22, 1919.
1,344,355.
Patented June 22, 1920.
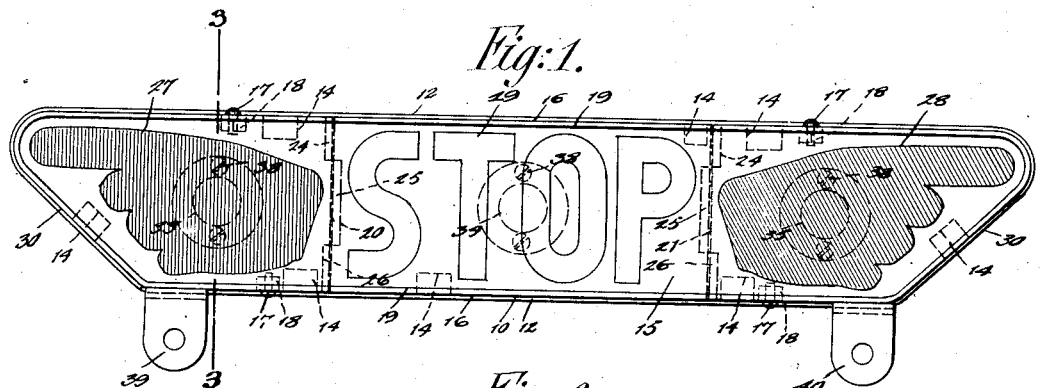
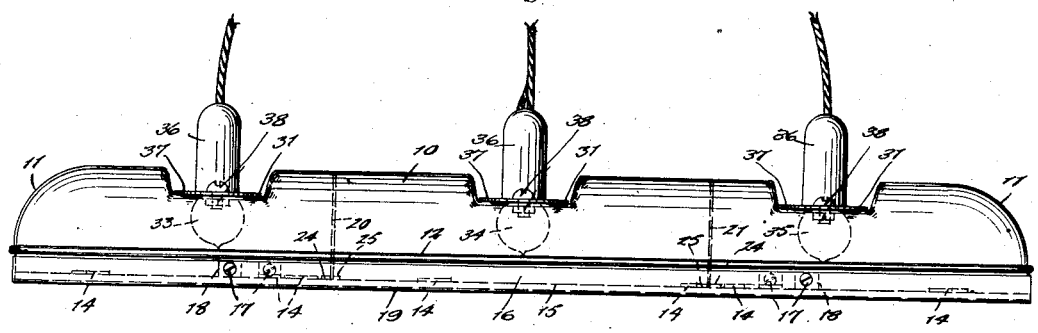
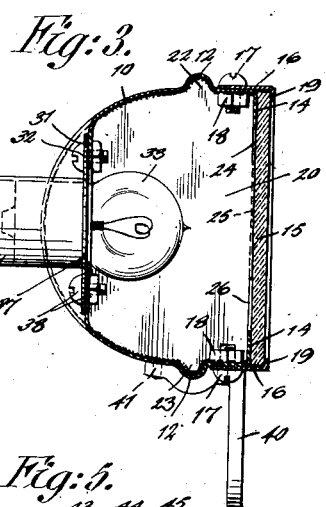
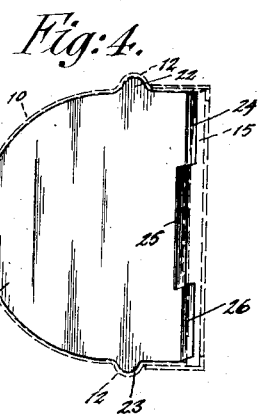
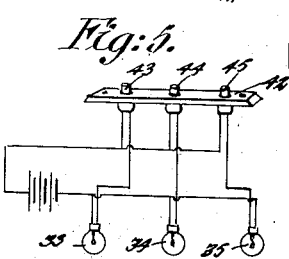
INVENTOR
C. Roth
BY C. P. Goepel
ATTORNEY

UNITED STATES PATENT OFFICE.

CHARLES ROTH, OF BROOKLYN, NEW YORK.

AUTOMOBILE SIGNAL DEVICE.

1,344,355. Specification of Letters Patent. Patented June 22, 1920.

Application filed October 22, 1919. Serial No. 332,473.

*To all whom it may concern:*

Be it known that I, CHARLES ROTH, a citizen of the United States, and a resident of the borough of Brooklyn, county of Kings, city and State of New York, have invented certain new and useful Improvements in Automobile Signal Devices, of which the following is a specification.

The present invention relates to improvements in automobile signal devices, particularly of the type intended to indicate that the automobile is about to turn to the right or left or to stop, and has for an object to provide such a device by means of which the signals may be made in a clear and unmistakable manner, and which will at the same time be of such compact construction as to enable its support upon the license plate supporting bracket.

A further object is to provide an improved lighting means within the device, and novel constructive features by which a structure is provided which is water-tight exteriorly and is so formed interiorly that a plurality of compartments is provided for the respective lighting elements of the right, left and stop signals and which are light-tight relatively to each other so that illumination will be confined to one signal at a time.

A further object resides in novel fastening means for the glass panel and which will enable convenient access to the interior of the device when desired.

With these and other objects in view, an embodiment of my invention is shown in the accompanying drawings, and this embodiment will be hereinafter more fully described with reference thereto and the invention will be finally pointed out in the claims.

In the accompanying drawings,

Figure 1 is a front elevation of a signal device according to the present embodiment of my invention;

Fig. 2 is a top plan view thereof;

Fig. 3 is a vertical sectional view taken along the line 3—3 of Fig. 1;

Fig. 4 is a perspective view of one of the barrier plates; and

Fig. 5 is a diagrammatic view showing the arrangement of the electric circuit.

Similar reference characters indicate corresponding parts throughout the several figures of the drawings.

Referring to the drawings, the embodiment of my invention shown therein, comprises an elongated sheet metal casing 10, substantially semi-elliptical in cross section, the ends of the casing being rounded as at 11 to the plane of the open front side. The casing is provided longitudinally and spaced rearwardly from the forward edge with a rib 12 pressed outwardly therefrom and forming at once stiffening means for the casing and a positioning abutment for the angular panel holding frame presently to be referred to.

At the forward edges of the casing, there are provided in spaced relation, a plurality of ears 14 bent inwardly at right angles thereto and against which the glass panel 15 is placed and held by a holding frame 16, angular in cross section and fitted about the casing, being secured against the rib 12 by a plurality of suitably spaced screws 17 engaged in threaded nut blocks 18 fixed to the interior of the casing by soldering or other suitable means, the turned-in rim portion 19 of the frame engaging the marginal portion of the panel and holding it in place against the ears 14.

The casing is divided into three compartments by barrier or partition plates 20 and 21 corresponding in shape to the cross section of the casing and provided at their upper and lower sides with projecting ears 22 and 23 adapted to engage within the recesses formed upon the inner side of the casing by the rib 12, the barriers being soldered in place along their edges engaging the casing to form a light-tight barrier between the compartments.

At the forward edges of the barrier plates, there are provided flanges 24, 25 and 26 bent alternately in opposite directions at right angles thereto and forming a flat surface for engagement with the inner side of the glass panel, and at the same time form a tight spring jamb adapted to exclude light from passing between the front edge of the barrier and the glass panel.

The glass panel is provided at its portion overlying the compartment at one end with a pointing hand design or indicia 27 preferably of red and pointing in the direction away from the device, while the portion overlying the other end compartment is provided with a similar design 28 pointing in the opposite direction however, and preferably of green. The portion of the panel 11c overlying the intermediate compartment is provided with an inscription of the word "Stop" as at 29, preferably white. The surface of the panel other than the inscription of the word "Stop" and the two-hand designs is made opaque so that when the compartments are illuminated interiorly, only the word "Stop" or the hand designs as the case may be, are visible.

At the ends, the casing is inclined at the under side as at 30 to conform substantially to the shape of the hand designs, and giving to the casing the appearance of pointing to the direction to be indicated.

There are provided at the back of the casing and centrally of the several compartments flat indented portions 31, having circular openings 32 therein in which are inserted the electric incandescent lamps 33, 34 and 35, the socket portions 36 thereof being provided with circular flanges 37 secured by nuts and screws 38 to the said flat portions 31 of the casing.

At the under side of the casing there are provided a pair of angular brackets 39 and 40, the portion engaging the casing being shaped to conform to the rib 12 and secured by rivets 41. The device is of such size and design that it may be conveniently attached to the license plate supporting bracket above the license plate or may be oherwise suitably supported as desired.

In Fig. 5, I have shown a switch for operating the device and which consists of a plate 42 provided with three push button contact devices 43, 44 and 45 connected by suitable wiring to the respective lamps 33, 34 and 35. The plate may be attached to the steering wheel, the instrument board or at any other easily accessible place.

With my improvements a signal device is provided which will perform its functions efficiently, flashing the desired signals in a clear and unmistakable manner. The device is compact, water-tight and its interior is conveniently accessible for renewal of the lamp bulbs or for cleaning. The casing is preferably nickel plated interiorly and exteriorly, the plated inner surface acting as a reflector for the lamp.

I have illustrated and described a preferred and satisfactory embodiment of my invention, but it is obvious that changes may be made therein within the spirit and scope thereof as defined in the appended claims.

I claim:

1. A signal device for vehicles comprising a casing having a bead pressed outwardly therefrom providing a recess entering the bead from the interior of the casing, a partition in the casing having an ear projecting therefrom and entering the recess provided by said bead, translucent signal carrying means in the casing having indicia of different characters thereon at opposite sides of the partition, and illuminating means in the casing at opposite sides of the partition.

2. A signal device for vehicles comprising a casing of sheet metal having one face thereof left open, said casing being pressed outwardly at its upper and lower portions near the open side thereof to provide recesses communicating with the interior of the casing, partitions dividing said casing into a plurality of compartments, said partitions having ears projecting from the upper and lower portions thereof, said ears occupying recesses formed by the pressed-out portions of the casing, a translucent cover for the casing containing different indicia at the open sides of each of the compartments, and individual illuminating means adapted to be selectively controlled, said illuminating means placed in the several compartments.

3. A direction signal for vehicles comprising a casing of sheet material bent in substantially parabolic form in cross section and having one side thereof open, said casing having the ends thereof curved toward the front open end and further having such ends inclined downwardly from the upper portion to the lower portion of the casing, partitions in said casing for dividing the same into a plurality of compartments, a translucent panel extending across the open portion of the casing and being provided with indicia in the central portion thereof to indicate that the vehicle is to be brought to a stop, said panel having pointing hands at the portions thereof to each side of the central part with the index fingers of the hands pointing in opposite directions and having the tips of the pointing fingers extending in the upper outermost end portions of the casing with the remaining fingers of the hands folded and retreating downwardly in substantial parallelism with the inclined end walls of said casing, the closed side of the casing having flattened portions, lamp sockets set in said flattened portions, and lamps fitted in said sockets and disposed in the several compartments.

4. A signal device for vehicles comprising an elongated casing substantially semi-elliptical in cross section and open at its front side, barrier means dividing said casing into a plurality of compartments, a panel disposed over said front side, said casing being provided relatively to each of said compartments and at the rear thereof, with flat apertured portions, lamp sockets provided with flanges secured to said flat apertured portions, and lamps disposed within said respective compartments engaging said sockets.

5. A signal device for vehicles comprising an elongated casing of sheet material having a bead pressed out from the surface of the material near the front side thereof, barriers in the casing dividing the same into a plurality of compartments, said barriers having ears projecting from the edges thereof and adapted to enter the recesses formed in the inner portions of the casing by said bead, said barriers being of sheet material and having flanges bent from the front edges thereof in alternate directions and extending at substantially right angles to the planes of the barriers, a panel fitting to the front side of the casing and against the flanges on said barriers, said panel bearing indicia in front of the several compartments, means removably attached to the casing for holding said panel in place, and illuminating means in each compartment.

In testimony that I claim the foregoing as my invention, I have signed my name hereunder.

CHARLES ROTH.